United States Patent [19]
Chung

[11] Patent Number: 5,931,514
[45] Date of Patent: Aug. 3, 1999

[54] DETACHABLE CONNECTION BETWEEN TWO HOUSING SECTIONS

[75] Inventor: Kai Tang Chung, Chun, Taiwan

[73] Assignee: U.S. Philips Corporation, New York, N.Y.

[21] Appl. No.: 08/957,991

[22] Filed: Nov. 5, 1997

[30] Foreign Application Priority Data

Nov. 21, 1996 [EP] European Pat. Off. ............. 96203267

[51] Int. Cl.⁶ ...................................................... E05C 3/04
[52] U.S. Cl. ............................... 292/89; 292/80; 292/87; 220/326
[58] Field of Search .................................. 292/80, 81, 84, 292/87, 88, 89, DIG. 11, DIG. 38; 220/323, 324, 326

[56] References Cited

U.S. PATENT DOCUMENTS

| | | |
|---|---|---|
| 3,429,603 | 2/1969 | Gejoff . |
| 4,212,415 | 7/1980 | Neely ...................................... 222/231 |
| 4,964,661 | 10/1990 | Cadwell ................................... 292/87 |
| 5,013,073 | 5/1991 | Pehr ........................................ 292/87 |
| 5,100,015 | 3/1992 | Vandestuyf .............................. 220/326 |
| 5,348,356 | 9/1994 | Moulton ................................... 292/80 |
| 5,533,240 | 7/1996 | Murai ...................................... 24/615 |
| 5,551,589 | 9/1996 | Nakamura ............................... 220/326 |
| 5,577,799 | 11/1996 | Dangel ..................................... 292/80 |

FOREIGN PATENT DOCUMENTS

| | | | |
|---|---|---|---|
| 0384650A2 | 2/1990 | European Pat. Off. | ......... H05K 5/00 |
| 0491270A2 | 12/1991 | European Pat. Off. | .......... A45C 5/02 |
| 0491270A3 | 6/1992 | European Pat. Off. | .......... A45C 5/02 |

*Primary Examiner*—Steven Meyers
*Assistant Examiner*—Gary Estremsky
*Attorney, Agent, or Firm*—Edward W. Goodman

[57] ABSTRACT

A detachable connection between two housing sections (1, 2) has two cooperating latching elements formed by a resilient tongue (7) with a peripheral portion (9) on one housing section (1) and a projection (10) on the other housing section (2), the projection (10) engaging behind the peripheral portion (9) in an interconnected condition of the housing sections. In order to enable the housing sections to be separated easily from one another, the housing sections have two other cooperating latching element formed by a second projection (15) and a second peripheral portion (14), one of the latching elements being connected to the tongue (7). To unlatch the housing sections, the resilient tongue (7) is pressed back, thereby unlatching the first projection (10) and also locking the tongue against springing back in that the second projection (15) engages behind the second peripheral portion (14).

6 Claims, 4 Drawing Sheets

DETACHABLE CONNECTION BETWEEN TWO HOUSING SECTIONS

BACKGROUND OF THE INVENTION

1. Field of the Invention

The invention relates to a detachable connection between two housing sections having walls whose end faces can be joined to one another, a first housing section comprising a resilient wall portion having a first latching element, the second housing section comprising a second latching element which cooperates with the first latching element for latching the housing sections in an interconnected condition, and a wall of one of the housing sections having a recess at the location of the connection, for pressing the resilient wall portion aside, opposed by the resilience of the resilient wall portion, to unlatch the housing sections.

2. Description of the Related Art

Such a construction for securing two housing sections to one another is generally known, for example, from European Patent Application EP-A-0491270. The latching elements usually comprise a projection of one housing section and a peripheral portion of the other housing section, either the projection or the peripheral portion being arranged on a resilient wall portion. The connection is established in that the projection snaps behind the peripheral portion. Many apparatuses, such as television sets, monitors, but also any domestic appliances may have housing sections connected to one another by such a snap connection. If the housing sections are to be detached from one another, for example, in order to repair or to replace components inside the housing or to remove them in view of environmental aspects, the snap connection should be released. This is effected by pressing the resilient wall portion with the latching element away, so as to release the connection. Such housing sections generally have a plurality of these snap connections. The resilient wall portions of all these snap connections should then be pressed inward at the same time in order to detach the housing sections from one another. This is nearly always a problem.

SUMMARY OF THE INVENTION

It is an object of the invention to improve a detachable connection between two housing sections, of the type defined in the opening paragraph, in such a manner that the housing sections can be detached from one another in simple manner.

To this end the invention is characterized in that one of the housing sections has a third latching element, and that the resilient wall portion further comprises at least a fourth latching element for cooperation with the third latching element for locking the resilient wall portion in an unlatched condition of the housing sections.

When the connection between the housing sections is unlatched, the unlatched position is locked by the cooperation between the third and the fourth latching element. This locking is effected automatically when the resilient wall portion is pressed away, as a result of which the first and the second latching element can no longer cooperate with one another. These elements cannot cooperate until said locking has been cancelled.

A preferred embodiment of the invention is characterized in that the resilient wall portion is a tongue, and the first latching element is a peripheral portion of the tongue, that the second latching element is a first hook-shaped projection which engages behind the peripheral portion of the resilient tongue in the interconnected condition of the housing sections, that the third latching element is a second peripheral portion of a wall portion of one of the housing sections, and that the fourth latching element is a second hook-shaped projection which engages behind the second peripheral portion in an unlatched condition of the housing sections.

By pressing the resilient tongue sideways, the connection is released and the second projection hooks automatically behind the second peripheral portion, as a result of which the resilient tongue can no longer spring back. Housing sections and walls of housing sections are nearly always made of a plastic and are therefore slightly elastic. Since the projection is hook-shaped, the wall portion is pressed back slightly by the inclined surface of the hook-shaped projection owing to the elasticity of the wall portion, after which the projection engages behind the peripheral portion of the wall portion. In the present example, the first latching element is a peripheral portion of the resilient tongue and the second latching element is a hook-shaped element. Obviously, this can be the other way round, i.e., the resilient tongue has a hook-shaped element and the peripheral portion which cooperates with this hook-shaped element is provided on the second housing section.

The third latching element can be attached to the first housing section or to the second housing section. If the third latching element is attached to the first housing section, locking of the resilient wall portion in the unlatched position of the housing sections is effected wholly in the first housing section, which means that after the housing sections have been removed from one another the resilient wall portion must be unlocked by hand by pushing back the resilient wall portion. However, this is very simple owing to the elasticity of the material.

Preferably, however, the third latching element is attached to the second housing section. In this respect an embodiment is characterized in that the wall portion comprising the third latching element is an L-shaped rib secured to the second housing section, the longitudinal direction of the rib extending transversely to the end faces of the housing sections, and one limb of the L-shaped rib extending substantially perpendicularly to the wall of the second housing section and the other limb of the L-shaped rib comprising said second peripheral portion of the latching element. After the housing sections have been removed from one another the resilient wall portion is unlocked automatically and springs back to its original position. In fact, all the latching elements have then resumed their original positions, so that the housing sections can again be connected to one another.

In a further embodiment of the connection described above, the first housing section has guide means for guiding the L-shaped rib of the second housing section in the longitudinal direction of the rib. This makes it easier to position the housing sections onto each other, as a result of which it is simpler to establish the connection.

BRIEF DESCRIPTION OF THE DRAWINGS

The invention will now be described in more detail, by way of example, with reference to an embodiment shown in the drawings. In the drawings.

DESCRIPTION OF THE PREFERRED EMBODIMENTS

Figure 1:
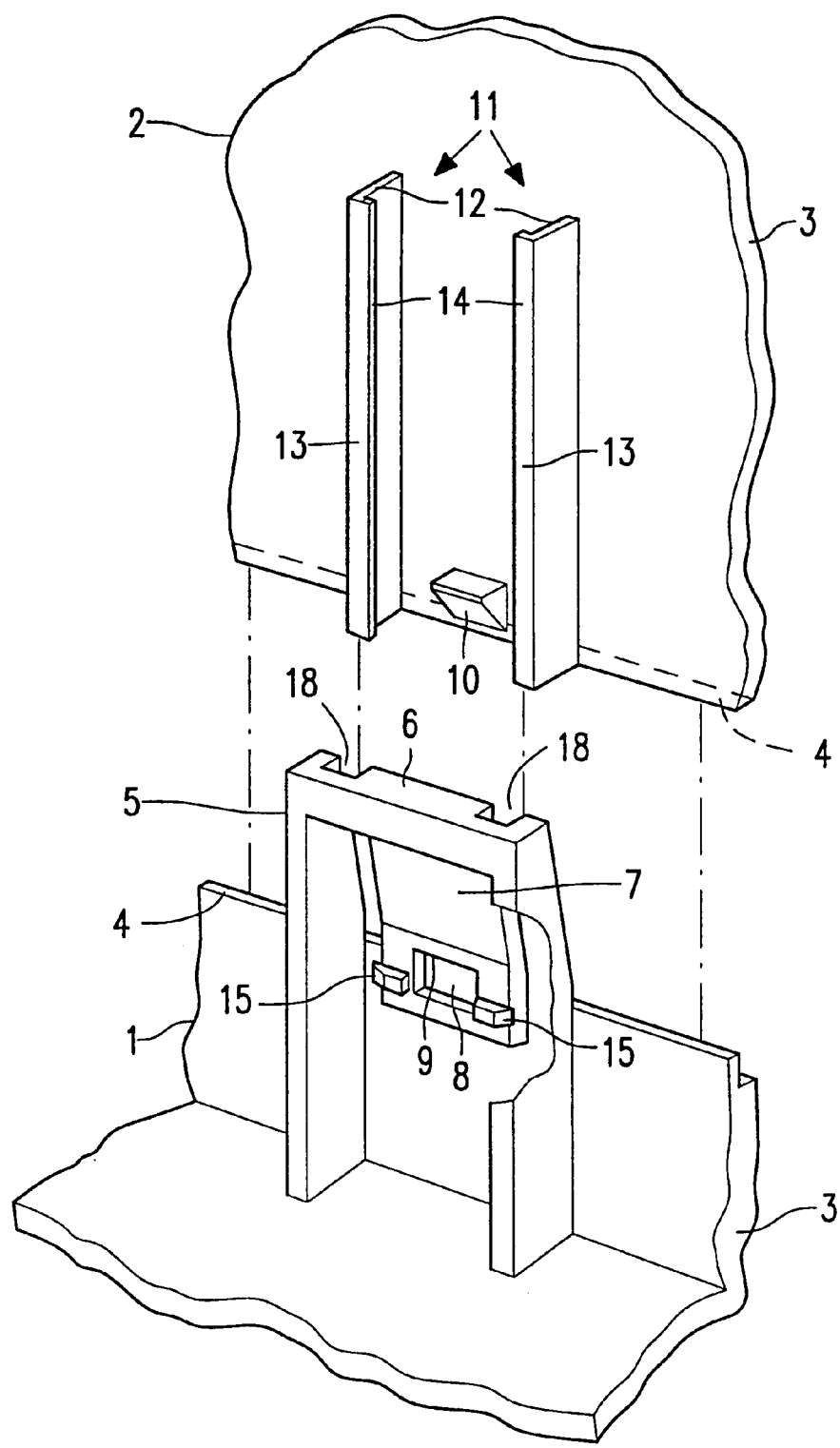
FIG. 1 is a perspective view showing parts of the housing sections with the latching elements in a disassembled condition and viewed from one direction.
Figure 2:
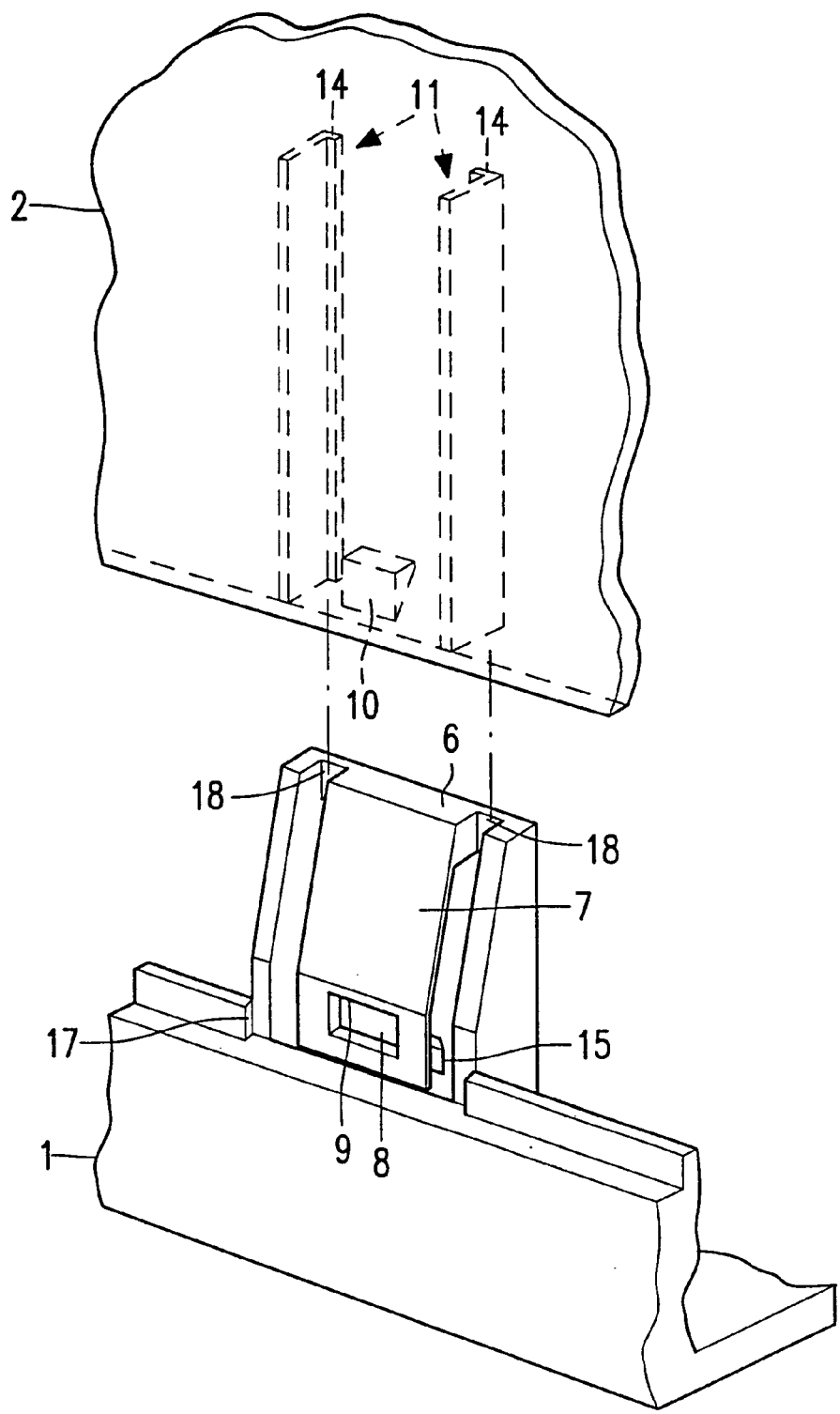
FIG. 2 is a perspective view showing parts of the housing sections of FIG. 1, viewed from another direction.
Figure 3:
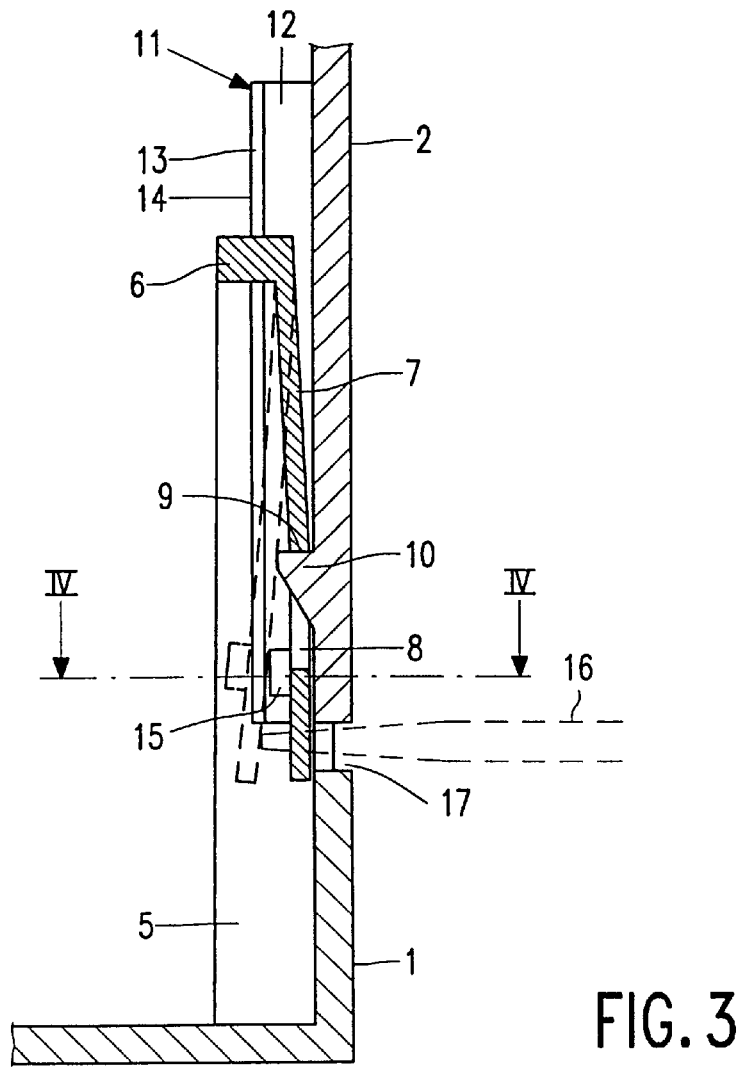
FIG. 3 is a cross-sectional view of the parts of the housing sections shown in FIG. 1 in a latched position.
Figure 4:
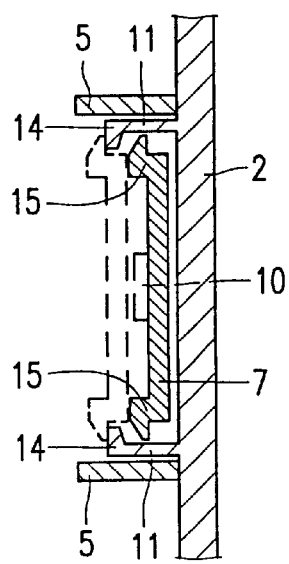
FIG. 4 is a cross-sectional view according to the line IV—IV of FIG. 3.

In the Figures, the first housing section bears the reference numeral 1 and the second housing section bears the reference numeral 2. Both housing sections have walls 3 with end faces 4, which abut against one another when the housing sections are connected to each other. The first housing section 1 comprises a U-shaped wall portion 5, a resilient tongue 7 being connected to the base 6 of the U-shaped wall portion. The resilient tongue has an opening 8, the first latching element being formed by a peripheral portion 9 which bounds the opening. It is not necessary for the tongue to have an opening. It is only necessary that the tongue has a peripheral portion. The inner side of the wall 3 of the second housing section 2 carries a hook-shaped projection 10. When the housing sections are placed onto one another, the projection 10 first urges the resilient tongue 7 slightly inward until the projection has moved past the peripheral portion 9 of the tongue, as a result of which the tongue 7 springs back and the projection 10 hooks behind the peripheral portion 9 (see FIGS. 3 and 4). The projection 10 then engages the opening 9. Thus, the housing sections are connected to one another. This connection is generally known and is frequently used.

For detaching the connection, the second housing section 2 comprises two spaced-apart wall portions 11 in the form of L-shaped ribs. These ribs 11 are disposed on the inner side of the wall 3 of the second housing section at opposite sides of the projection 10. The longitudinal direction of the ribs corresponds to the direction in which the housing sections are placed onto each other. The longer limb 12 of the rib extends perpendicularly to the wall 3 and the shorter limb 13 of the rib extends parallel to the wall. The shorter limbs point towards one another. The shorter limbs each have a second peripheral portion 14 which forms the third latching element. The fourth latching element comprises two hook-shaped projections 15 secured to the resilient tongue 7. The connection is released by pressing the resilient tongue 7 aside by means of an object, for example, the rim of a coin or a screwdriver 16. To this end, the first housing section 1 has a recess 17 at the location of the connection near the end face 3, through which recess the screwdriver 16 can be inserted. When the resilient tongue 7 is pressed aside the first projection 10 and the first peripheral portion 9 are first disengaged from one another. Subsequently, as the tongue is pressed away further, the second projections 15 engage behind the second peripheral portions 14 of the ribs 11. As a result of this, the resilient tongue 7 is locked in place and cannot spring back. This situation is shown in broken lines. The first latching element (first peripheral portion 9) is thus locked in place and cannot cooperate with the second latching element (first projection 10). If this is done for all the connections between the two housing sections, the housing sections can subsequently be easily removed from one another.

The U-shaped wall portion 5 in the first housing section 1 also comprises guide means 18 for the L-shaped ribs 11 in the second housing section 2. For this purpose, the base 6 of the U-shaped wall portion 5 has recesses 18 in which the shorter limbs 13 of the L-shaped ribs are engageable. This makes it easier to position the housing sections and, consequently, the cooperating latching elements relative to one another.

Figure 5:
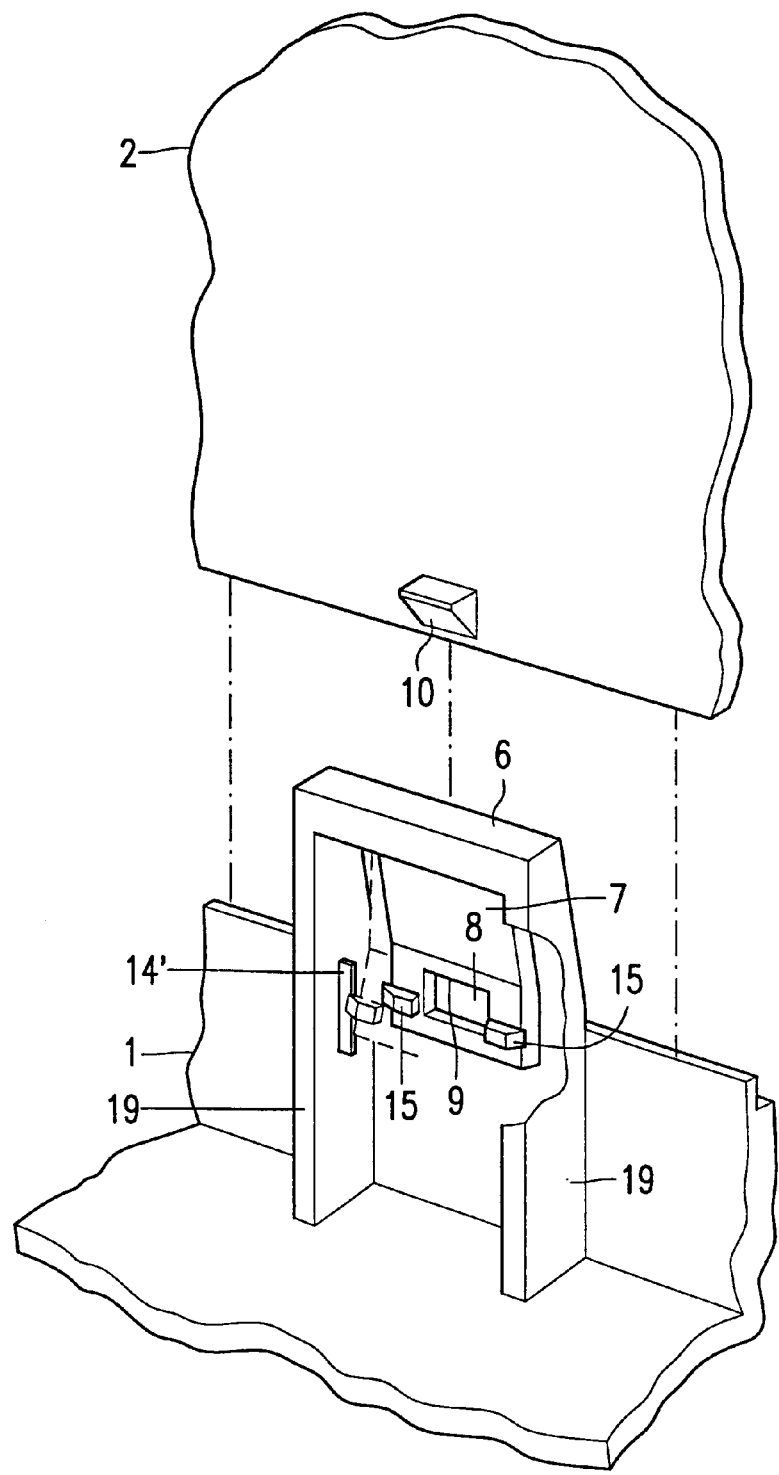
FIG. 5 is a perspective view showing parts of the housing sections of FIG. 1, but now in accordance with an alternative construction.

FIG. 5 shows an alternative construction for locking the resilient tongue. The third latching element is now formed by a protrusion 14' on each limb 19 of the U-shaped wall portion 5. The resilient tongue 7 is locked in the same way as described above, i.e., the second hook-shaped projection 15 engages behind a peripheral portion of the protrusion 14'. When the housing sections 1, 2 using such a construction are connected to one another again, all the resilient tongues 7 should first be pressed from their locked positions into their original positions. However, this is quite simple owing to the elasticity of the material.

What is claimed is:

1. A detachable connection between a first housing section and a second housing section having walls whose end faces are arranged to be joined to one another, said detachable connection comprising a resilient wall portion having a first latching element, said resilient wall portion being arranged on said first housing section, said resilient wall portion being a tongue and the first latching element being a peripheral portion of the tongue;

a second latching element arranged on the second housing section for cooperation with the first latching element for latching the first and second housing sections in an interconnected condition, said second latching element being a first hook-shaped projection for engaging behind the peripheral portion of the resilient tongue in the interconnected condition of the first and second housing sections; and a wall of one of the first and second housing sections having a recess at the location of the connection, for pressing the resilient wall portion aside, opposed by the resilience of the resilient wall portion, to unlatch the first and second housing sections, characterized in that said detachable connection further comprises:

latching means for locking the resilient wall portion in an unlatched condition of the first and second housing sections, said latching means including a third latching element arranged on one of said first and second housing sections, and a fourth latching element arranged on said resilient wall portion for cooperation with the third latching element, said third latching element being a second peripheral portion of a wall portion arranged on one of the first and second housing sections, and the fourth latching element being a second hook-shaped projection for engaging behind the second peripheral portion in an unlatched condition of the first and second housing sections, wherein the wall portion comprising the third latching element is an L-shaped rib secured to the second housing section, the longitudinal direction of the rib extending transversely to the end faces of the first and second housing sections, and one limb of the L-shaped rib extending substantially perpendicularly to the wall of the second housing section, and the other limb of the L-shaped rib comprising the second peripheral portion of the third latching element.

2. A detachable connection as claimed in claim 1, characterized in that the first housing section has guide means for guiding the L-shaped rib of the second housing section in the longitudinal direction of the rib.

3. A detachable connection as claimed in claim 2, characterized in that the first housing section has a U-shaped wall portion, a base of the U-shaped wall portion having a recess which forms the guide means for the L-shaped rib.

4. A detachable connection as claimed in claim 3, characterized in that the L-shaped rib is secured to the base of the U-shaped wall portion.

5. A detachable connection as claimed in claim 1, characterized in that the wall portion comprising the third latching element is secured to the first housing section.

6. A detachable connection as claimed in claim 1, characterized in that the tongue has an opening and the first latching element is a peripheral portion which bounds the opening, and the first hook-shaped projection engages the opening in the latched condition of the housing sections, the projection engaging behind the peripheral portion.

* * * * *